United States Patent
Szczygielski

(10) Patent No.: US 9,234,387 B2
(45) Date of Patent: Jan. 12, 2016

(54) SNUBBER DEVICES FOR USE IN ROLL-UP DOOR ASSEMBLIES

(71) Applicant: Whiting Door Manufacturing Corporation, Akron, NY (US)

(72) Inventor: Mark J. Szczygielski, Akron, NY (US)

(73) Assignee: Whiting Door Manufacturing Corp., Akron, NY (US)

( * ) Notice: Subject to any disclaimer, the term of this patent is extended or adjusted under 35 U.S.C. 154(b) by 21 days.

(21) Appl. No.: 14/034,858

(22) Filed: Sep. 24, 2013

(65) Prior Publication Data

US 2015/0083348 A1 Mar. 26, 2015

(51) Int. Cl.
*B60J 5/12* (2006.01)
*E06B 9/06* (2006.01)
*B60J 5/14* (2006.01)
*B60J 5/10* (2006.01)

(52) U.S. Cl.
CPC .................. *E06B 9/0638* (2013.01); *B60J 5/14* (2013.01); *B60J 5/108* (2013.01)

(58) Field of Classification Search
USPC ......... 160/190, 191, 192, 193, 265, 201, 213; 16/198, 194, 196, 86 A
IPC ...... E05D 13/1215,13/1261, 13/1238, 13/1284, E05D 13/145; E06B 9/62, 9/58; B60J 5/108
See application file for complete search history.

(56) References Cited

U.S. PATENT DOCUMENTS

| | | | | | |
|---|---|---|---|---|---|
| 1,922,370 | A | * | 8/1933 | Blodgett et al. | 160/191 |
| 3,160,200 | A | * | 12/1964 | McKee et al. | 160/189 |
| 3,213,924 | A | * | 10/1965 | Crosswell | 160/191 |
| 3,412,780 | A | * | 11/1968 | Moler | 160/191 |
| 4,115,900 | A | * | 9/1978 | Mihalcheon | 16/104 |
| 4,871,007 | A | * | 10/1989 | Abolins | 160/201 |
| 5,404,927 | A | * | 4/1995 | Bailey | 160/201 |
| 6,189,266 | B1 | * | 2/2001 | Mihalcheon | 49/322 |
| 7,635,017 | B2 | * | 12/2009 | Bennett et al. | 160/201 |
| 2012/0125545 | A1 | * | 5/2012 | Ehrlich | 160/229.1 |

* cited by examiner

*Primary Examiner* — David Purol
(74) *Attorney, Agent, or Firm* — Phillips Lytle LLP

(57) ABSTRACT

An improved roll-up door assembly (10) is configured to be coupled to a storage container, such as a truck trailer (11), and broadly comprises: a roll-up door including a plurality of door panels (12A-12G), of which adjacent panels are hingedly coupled to one another; a hinge (29) having an first hinge plate (30) coupled directly to a bottom panel (12A) of the door, having a second hinge plate (31), and having a hinge joint (32) pivotally coupling the first and second hinge plates to one another for enabling relative movement therebetween; a bottom roller (33) coupled to the second hinge plate for movement therewith about the joint; a counterbalance mechanism mounted on the storage container; a cable (22) connecting the counterbalance mechanism to the bottom door panel; and a snubber (26) surrounding the cable and adapted to engage the counterbalance mechanism when the bottom door panel is moved toward the counterbalance mechanism.

6 Claims, 4 Drawing Sheets

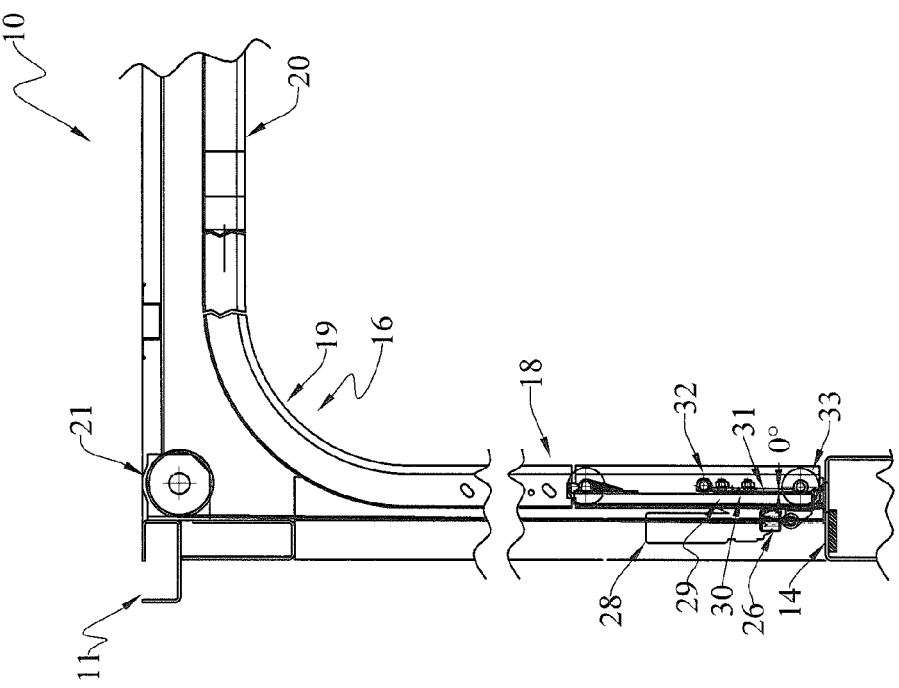
Fig. 3
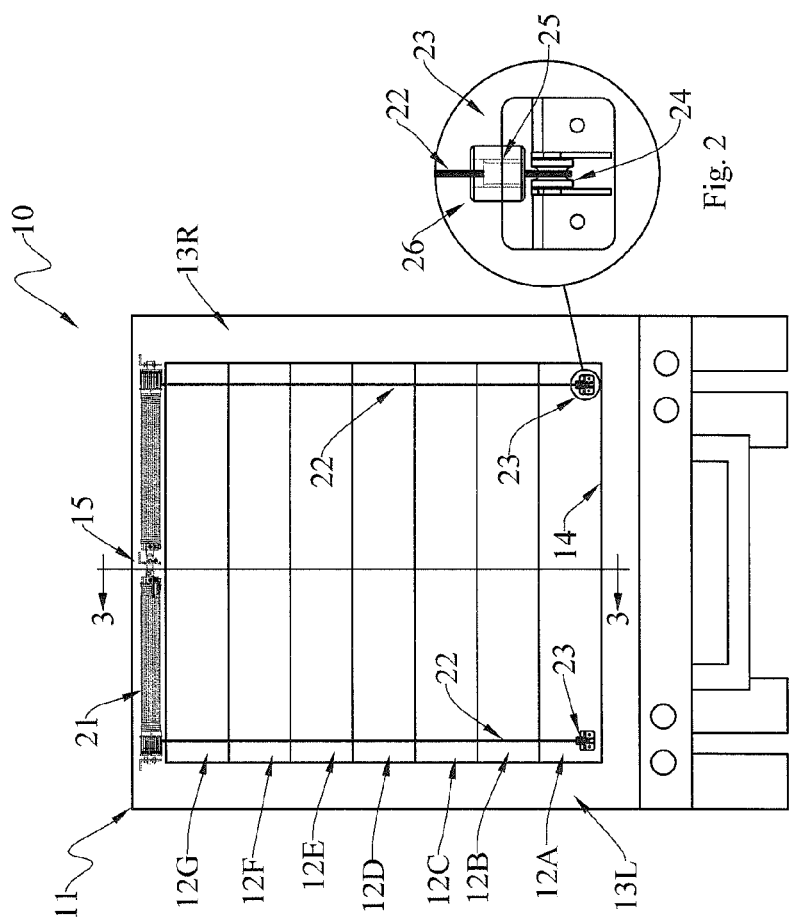
Fig. 2
Fig. 1

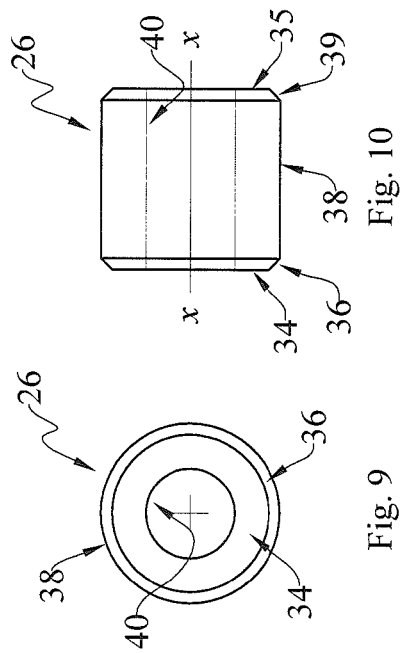
Fig. 9
Fig. 10
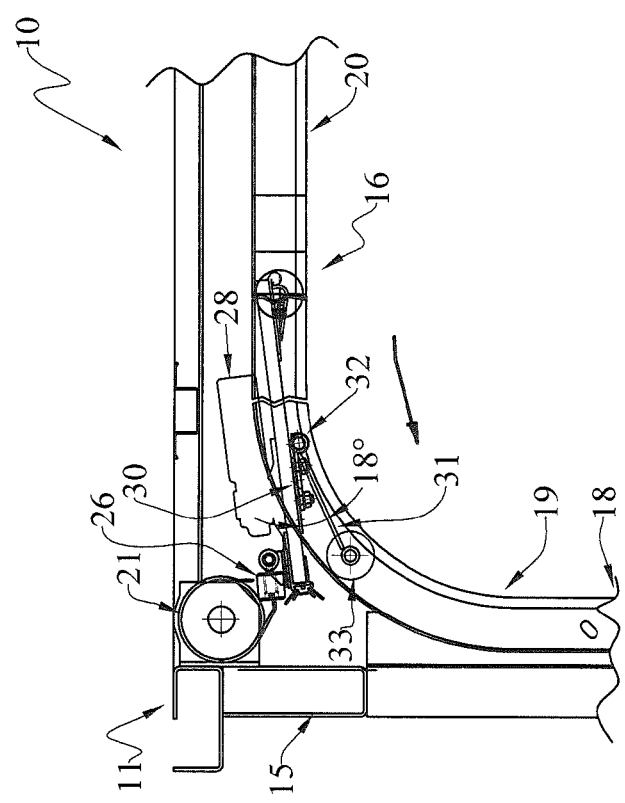
Fig. 8

SNUBBER DEVICES FOR USE IN ROLL-UP DOOR ASSEMBLIES

TECHNICAL FIELD

The present invention relates generally to roll-up doors that are commonly found on trucks, trailers and static structures, and, more particularly, to improved snubber devices for use with such roll-up doors to prevent damage to a cable drum when the door is raised.

BACKGROUND ART

Roll-up doors are commonly found on trucks and trailers, and on static structures (e.g., garage doors) as well.

These doors have a series of panels that are mounted for movement in a pair of opposed tracks between a lowered access-preventing vertical position, and a raised overhead out-of-the-way access-permitting horizontal position. Adjacent panels are hingedly joined to one another such that the various panels are mechanically connected in series. The tracks have a lower vertical portion, an intermediate arcuate or curved portion, and an upper overhead horizontal portion.

In recent years, there has been a movement to attempt to increase the size of the access opening through which cargo is moved into and out of a protected space (e.g., the cargo body, the interior of a static structure, etc.). The size of the access opening can be increased by (a) decreasing the width of the jambs on the structure on which the door is mounted so as to increase the width of the access opening, and/or by (b) decreasing the height of the overhead header so as to increase the height of the access opening. Such an increased-size access opening can allow for ingress and egress of larger-sized cargo and vehicles.

Typically, a counterbalance mechanism is mounted within the protected space, and is connected to the door to balance at least some of its weight. The counterbalance mechanism is typically mounted inside the protected space immediately behind the header.

While the vertical dimension of the header has been reduced to increase the size of the access opening, the three portions of the track (i.e., the vertical, arcuate and horizontal portions) must still allow for smooth continuous movement of the door between its closed and opened positions.

To accommodate this, and to allow the raised door to be concealed behind the projected vertical height of a reduced-dimension header, it is known to mount a pair of pivoted hinges on the lowermost door panel. This type of hinge has one plate portion attached to the lowermost door panel, and has a second plate portion pivotally connected to the first plate portion. The roller is mounted on the distal marginal end portion of the second plate portion. When the door is in its lowered access-closing position, the second plate portion lies adjacent the first plate portion. However, when the door is raised to its overhead out-of-the-way position, the second plate portion may pivot relative to the first plate portion to allow the lowermost door panel to be concealed behind the projected header dimension while the roller on the second plate portion is still in the track arcuate portion.

One species of such a pivoted hinge structure is shown and described in US 2012/0125545 A1, the aggregate disclosure of which is hereby incorporated by reference. While this reference has such a pivoted hinge structure attached to the lowermost panel, it also has a generally L-shaped stop mechanism (indicated at 250 in such reference) that is mounted on the inside of the header, for preventing the lowermost door panel of the raised door from going past a predetermined position. (See, e.g., FIG. 7, and paragraphs [0099]-[0100] of this reference.)

While such a stop mechanism may be functional initially, it may become loose or deformed with use, and/or may permit the bottom door panel to move past its desired maximum desired position. In either event, the stop mechanism may possibly interfere with attempts to subsequently lower the door.

DISCLOSURE OF THE INVENTION

With parenthetical reference to the corresponding parts, portions or surfaces of the disclosed embodiment, merely for purposes of illustration and not by way of limitation, the present invention provides an improved roll-up door assembly (10) configured to be coupled to a storage container, such as a truck trailer (11).

The improved door assembly includes: a roll-up door including a plurality of door panels (12A-12G), with adjacent panels being hingedly connected to one another; a hinge (29) having an first hinge plate (30) coupled directly to a bottom panel (12A) of the door, having a second hinge plate (31), and having a hinge joint (32) pivotally coupling the first and second hinge plates to one another for enabling relative movement therebetween; a bottom roller (33) coupled to the second hinge plate for movement therewith about the joint; wherein the door is adapted to be moved between a lowered closed position at which the bottom door panel is in a vertical orientation, and an upper opened position at which the bottom door panel is in a horizontal orientation; a counterbalance mechanism (21) mounted on the storage container; a cable (22) connecting the counterbalance mechanism to the bottom door panel; and a snubber (26) surrounding the cable and adapted to engage the counterbalance mechanism when the bottom door panel is moved toward the counterbalance mechanism.

In one form, the snubber loosely surrounds the cable, and is slidable therealong. In another form, the snubber is fixed to the cable.

The snubber is preferably formed of a suitable elastomeric material, such as a suitable nylon, to cushion contact with the counterbalance mechanism.

The snubber may be an annular member, and may be either removably or nonremovably mounted on the cable when the door is in its lowered position.

Accordingly, the general object of the invention is to provide an improved roll-up door assembly.

Another object is to provide an improved roll-up door assembly having a snubber for use with a pivoted hinge attached to the lowermost door panel.

Still another object of the invention is to provide an improved roll-up door assembly having a snubber for cushioning contact with a counterbalance mechanism when the door is raised.

These and other objects and advantages will become apparent from the foregoing an ongoing written specification, the drawings and the appended claims.

BRIEF DESCRIPTION OF THE DRAWINGS

FIG. 1 is a rear elevation of a cargo-carrying trailer showing the roll-up door as being in its lowered access-closing position.

FIG. 2 is an enlarged detail view of the structure within the indicated circle of FIG. 1, showing the right cable anchor as being attached to the lowermost door panel with the snubber surrounding the cable immediately above this anchor.

FIG. 3 is a fragmentary vertical sectional view, taken generally on line 3-3 of FIG. 1, showing the left track, the overhead counterbalancing mechanism, and further showing the lowermost door panel as being in its lowered position to close the access opening.

FIG. 8 is a fragmentary vertical sectional view, generally similar to FIG. 7, but showing still another position of the lowermost door panel as the door moves back toward the counterbalance mechanism.

FIG. 9 is a left end view of a preferred form of the snubber.

FIG. 10 is a side elevation of the snubber shown in FIG. 9.

DESCRIPTION OF THE PREFERRED EMBODIMENTS

Figure 5:
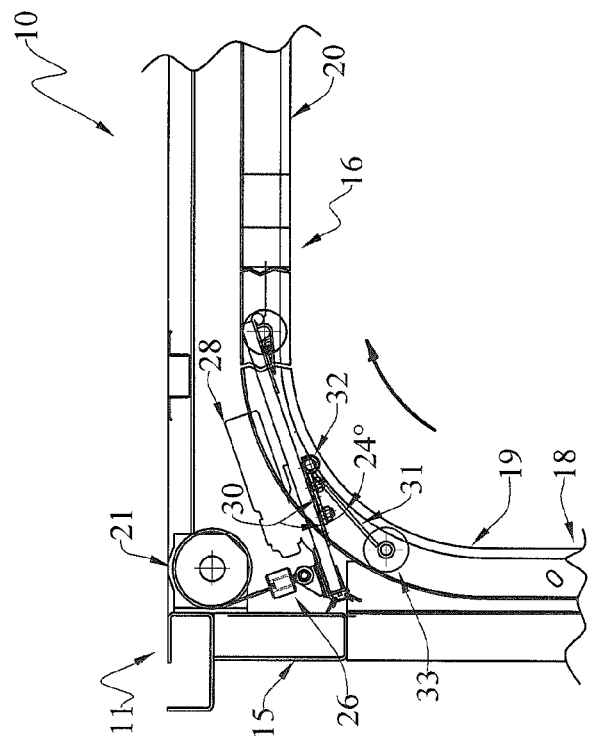
FIG. 5 is a fragmentary vertical sectional view, generally similar to FIG. 4, but showing another position of the lowermost door panel as the door is being further raised.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIGS. 1-3 thereof, the present invention broadly provides an improved roll-up door assembly, generally indicated at 10, that is configured to be mounted on a storage container, such as a truck trailer 11. The door assembly is shown as including a number of panels, severally indicated at 12 and individually identified by letters A-G, respectively. Adjacent panels are hingedly connected together in the conventional manner. In FIG. 3, only the lowermost panel 12A is shown. The other panels have been omitted in the interest of clarity to avoid obfuscating the invention.

In the example shown in the drawings, the trailer is shown as having a rearwardly-facing access opening defined by left and right door jambs 13L, 13R, respectively, a sill 14, and an overhead header 15. As best shown in FIG. 3, a track 16 is mounted on the trailer on either side of the access opening. Each track includes a lower vertically-disposed portion 18, and intermediate arcuate or curved portion 19, and an upper overhead horizontally-disposed portion 20. Each door panel is mounted on a plurality of rollers that are constrained within the opposed tracks for guided movement therealong.

A counterbalance mechanism 21 is located within the trailer body on the inside of header 15. As best shown in FIGS. 1 and 2, two cables, severally indicated at 22, are wrapped around the counterbalance mechanism, and have their lowermost marginal end portions secured to the lowermost panel 12A via two anchors, severally indicated 23. More particularly, the marginal end portion of each cable is wrapped around an annular member 24 of the cable anchor, and is secured by a cable clamp 25.

In a first embodiment, a snubber, generally indicated at 26, is slidably mounted on the cable. In FIG. 2, this snubber is shown as surrounding the cable clamp.

In FIGS. 3-8, a latch mechanism 28 is shown in outline form. This is a well-known part, and does not form a part of the claimed invention. However, it is shown in outline form in FIGS. 3-8, and is entirely omitted from FIG. 1 for clarity of illustration. The function of the counterbalance mechanism is to substantially balance the weight of the door so that the door may be more easily moved between its closed and opened positions. In the illustrated form, the counterbalance mechanism includes two cable drums and at least one torsional spring. However, the counterbalance mechanism is individually "old" per se.

A pivoted hinge, generally indicated at 29, is mounted on each side of lowermost door panel 12A. As shown in FIGS. 3-8, each hinge 29 has a first hinge plate 30 mounted on the bottom door panel 12A, has a second hinge plate 31, and has a hinge joint 32 pivotally connecting the first and second hinge plates to enable relative pivotal movement therebetween. A bottom roller 33 is mounted on the distal end of the second hinge plate for movement therewith about the hinge joint.

Figure 7:
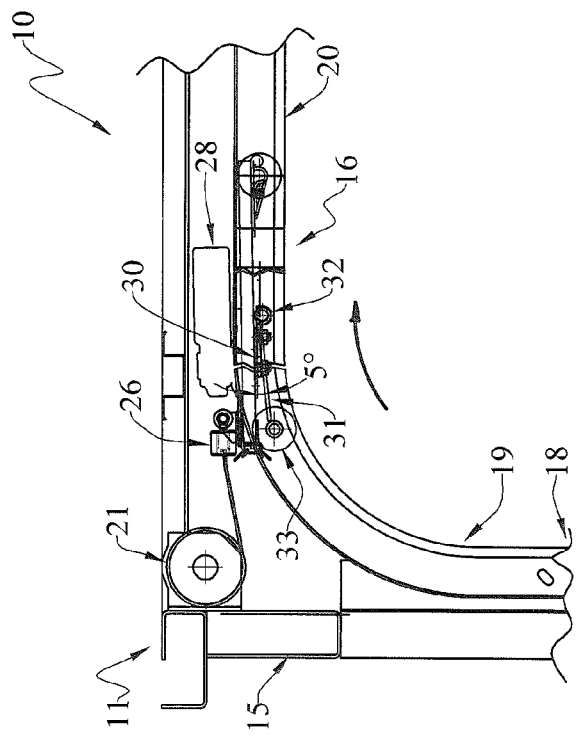
FIG. 7 is a fragmentary vertical sectional view, generally similar to FIG. 6, but showing another position of the lowermost door panel as the door is being further raised.
Figure 6:
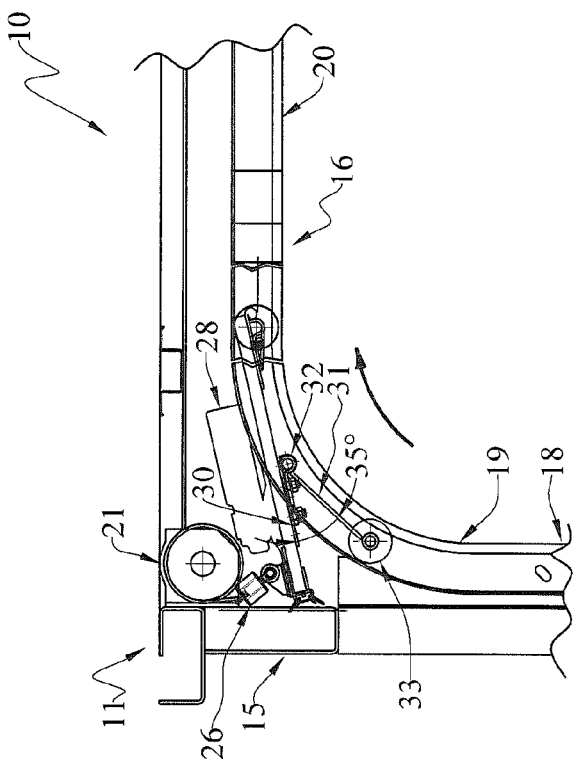
FIG. 6 is a fragmentary vertical sectional view, generally similar to FIG. 5, but showing another position of the lowermost door panel as the door is being further raised, this view also showing the snubber as engaging the counterbalance mechanism.

The door is adapted to be moved between a closed position, such as shown in FIG. 3, at which the bottom door panel is in a vertical orientation adjacent the sill, and an opened overhead position, such as shown in FIGS. 6-8, at which the bottom door panel is in an generally-horizontal out-of-the-way position and is concealed behind the projected height of the header. When the door is closed, the second hinge plate and the roller lie adjacent the first hinge plate. When the door is moved toward its opened position, the second hinge plate and the roller are inclined at an acute included angle to the first hinge plate. This is comparatively illustrated in FIGS. 3-8.

FIG. 3 depicts the position of the lowermost panel when the door is closed. In this position, the second hinge plate 31 lies adjacent the first hinge plate 30. In other words, the angle between these two hinge plates is substantially 0°. Note that roller 33 is also positioned adjacent the first hinge plate.

Figure 4:
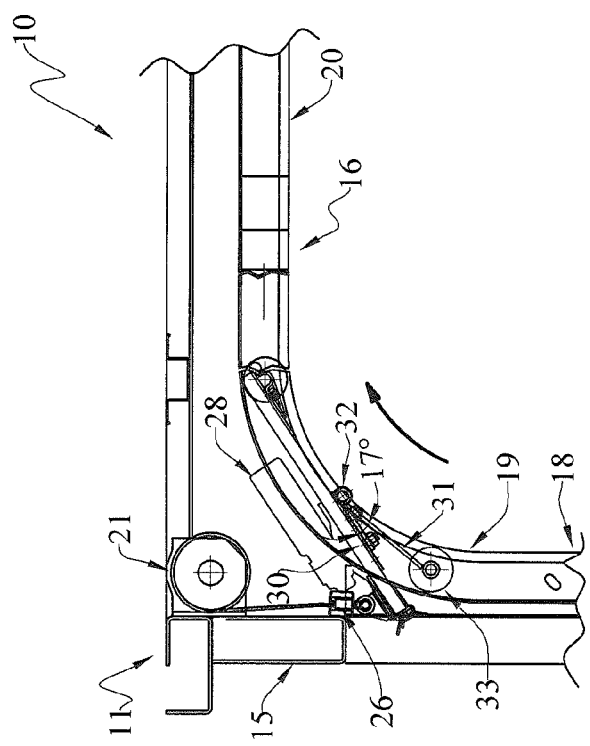
FIG. 4 is a fragmentary vertical sectional view, generally similar to the upper portion of the structure shown in FIG. 3, showing another position of the lowermost door panel as the door is being raised, this view also showing the pivoted hinge mounted on the lowermost door panel.

FIG. 4 illustrates the position of the lowermost panel 12A as the door moves upwardly along the track. In this position, the included angle between the first and second hinge plates 30, 31 is about 17°. Notice that the door is not fully raised because the lowermost edge of panel 12A is still positioned beneath the projected height of header 15.

FIG. 5 shows the position of lowermost panel 12A when the door is further raised from the position shown in FIG. 4. In this position, the included angle between the first and second hinge plates 30, 31 is about 24°. It should be noted that the door is still not in its fully-raised position because a portion of the seal at the lowermost edge of panel 12 is still positioned beneath the projected height of header 15.

FIG. 6 shows the position of lowermost panel 12A if the door is quickly raised. Note that the snubber 26 will engage the cable drum 21 to prevent damage thereto. In the position shown in FIG. 6, the included angle between the first and second hinge plates 30, 31 is about 35°. Note that the door is in its fully-raised position because all portions of the lowermost door panel 12A are concealed behind the projected height of the header.

FIG. 7 shows the position of the lowermost panel if the door is quickly raised such that the door is carried inertially along the horizontal portion of the track. Notice that some cable has been unwound from the counterbalance mechanism. In this position, the included angle between the first and second hinge portions 30, 31 is about 5°. This represents an unstable position of the raised door, because the counterbalance mechanism will tend to pull the door leftwardly along the track to decrease the force exerted by the counterbalance mechanism thereon.

FIG. 8 shows the position of the lowermost door panel when the counterbalance mechanism has pulled the overhead door back toward itself. In this position, the included angle between the first and second hinge portions 30, 31 is about 18°. Notice that the snubber 26 is positioned to contact the counterbalance mechanism during this leftward movement of the door to cushion the impact therebetween. Moreover, the diameter of the snubber also prevents cable anchor 23 from contacting the cable drum when the door is raised and lowered.

FIG. 9 is a left end elevation of a presently-preferred form of snubber 26, and FIG. 10 is a side elevation thereof. As depicted in these two figures, the snubber is a horizontally-elongated ring- or tube-like member having an annular vertical left end face 34; an annular vertical right end face 35; and an outer surface including left beveled edge 36, horizontal cylindrical surface 38, and right beveled edge 39. Beveled edges 36, 39 join surfaces 34, 38 and 35, 38, respectively. The snubber is provided with a central axial through-bore bounded by inwardly-facing cylindrical surface 40. The snubber is shown as having a longitudinal axis x-x. The length of the snubber is about one-inch, and this prevents the latch mechanism 28 from contacting the center brackets of the cable balancer (see FIG. 1) when the door is raised and lowered.

The snubber may be formed of a suitable elastomeric material, such as a suitable nylon. In the preferred form, the snubber is formed of a nylon material having a tensile strength of about 12,400 psi, a flexural modulus of about 410,000 psi, an izod impact (notched) of about 1.2 ft.-lbs. of notch, a heat deflection temperature of about 194° F. at a pressure of about 264 psi, a maximum continuous service temperature in air of about 210° F., a water absorption rate of about 1.20% after immersion for twenty-four hours, a coefficient of linear thermal expansion of about 4.5 in/in/° F.$\times 10^{-5}$, and a dynamic coefficient of friction of about 0.28.

The snubber may loosely surround the cable, and be slidable therealong. Alternatively, the snubber may be fixed to the cable, and may not be slidable therealong.

The snubber may be either removably or non-removably mounted on the cable, such as when the door is in its lowered position, as desired.

Therefore the present invention provides an improved roll-up door assembly 10 configured to be coupled to a storage container, such as a truck trailer 11. The improved roll-up door assembly comprises: an roll-up door including a plurality of door panels 12A-12G hingedly coupled to one another; a hinge 29 having an first hinge plate 30 coupled directly to a bottom panel of the door, having a second hinge plate 31, and having a hinge joint 32 pivotally coupling the first and second hinge plates to one another for enabling relative movement therebetween; a bottom roller 33 coupled to the second hinge plate for movement therewith about the joint; wherein the door is configured to move between a closed position at which the bottom door panel is in a vertical orientation and the bottom roller is positioned adjacent the bottom door panel, and an opened position at which the bottom door panel is in a horizontal orientation and the bottom roller is spaced from the door panel; a counterbalance mechanism 21 mounted on the storage container; a cable 22 connecting the counterbalance mechanism to the bottom door panel; and a snubber 26 surrounding the cable and adapted to selectively engage the counterbalance mechanism when the bottom door panel is moved toward the counterbalance mechanism.

Modifications

The present invention contemplates that many changes and modifications may be made. Features of the disclosed embodiment should not be imported into the claims unless a limitation appears therein.

For example, the snubber is not limited to the shape shown, and may be formed in other shapes as well. The material of construction is not deemed to be critical, and may be changed or modified, as desired. The snubber may be formed as an integral tube-like member, or may be formed sectionally or in multiple parts. As noted above, the snubber may be fixed to the cable, may be loosely mounted on the cable such that the snubber may be slidably moved therealong, and/or may be removably mounted on the cable (e.g., as by making the snubber of multiple parts that can be assembled or disassembled from the cable).

Thus, while several modifications of the disclosed embodiment have been described, persons skilled in this art will readily appreciate that various additional changes and modifications may be made without departing from the spirit of the invention, as defined and differentiated by the following claims.

What is claimed is:

1. A roll-up door assembly mounted on a storage container, such as a truck trailer, comprising:
   a roll-up door including a plurality of door panels, of which adjacent panels are hingedly coupled to one another;
   a hinge having an first hinge plate coupled directly to a bottom panel of said door, having a second hinge plate, and having a hinge joint pivotally coupling said first and second hinge plates to one another for enabling relative movement therebetween;
   a bottom roller coupled to said second hinge plate for movement therewith about said joint;
   wherein said door is adapted to be moved between a closed position at which said bottom door panel is in a vertical orientation, and an opened position at which said bottom door panel is in a horizontal orientation;
   a counterbalance mechanism mounted on said storage container;
   a cable connecting said counterbalance mechanism to said bottom door panel; and
   an elastomeric snubber surrounding said cable and adapted to cushion contact between said door and said counterbalance mechanism when said bottom door panel is selectively moved toward said counterbalance mechanism.

2. A roll-up door assembly as set forth in claim 1 wherein said snubber loosely surrounds said cable.

3. A roll-up door assembly as set forth in claim 1 wherein said snubber is fixed to said cable.

4. A roll-up door assembly as set forth in claim 1 wherein said snubber is an annular member.

5. A roll-up door assembly as set forth in claim 4 wherein said snubber is nonremovably mounted on said cable.

6. A roll-up door assembly as set forth in claim 4 wherein said snubber is removably mounted on said cable.

\* \* \* \* \*